United States Patent [19]

Perkins et al.

[11] Patent Number: 4,518,406
[45] Date of Patent: May 21, 1985

[54] DRAIN BUSHING

[75] Inventors: Richard A. Perkins, Newark; William C. Brady; Hellmut I. Glaser, both of Granville, all of Ohio

[73] Assignee: Owens-Corning Fiberglas Corporation, Toledo, Ohio

[21] Appl. No.: 558,680

[22] Filed: Dec. 6, 1983

[51] Int. Cl.³ .............................................. C03B 37/08
[52] U.S. Cl. ..................................... 65/1; 65/374.12; 420/443
[58] Field of Search ............ 420/443; 65/1, 2, 374.12; 148/426

[56] References Cited

U.S. PATENT DOCUMENTS

| | | | |
|---|---|---|---|
| 3,622,234 | 11/1971 | Seybolt et al. | 148/426 X |
| 3,640,705 | 2/1972 | Selman et al. | 75/172 |
| 3,754,902 | 8/1973 | Boone et al. | 420/443 |
| 3,754,903 | 8/1973 | Goward et al. | 420/443 |
| 4,155,731 | 5/1979 | Byrnes et al. | 65/1 |
| 4,274,852 | 6/1981 | McGarry | 65/2 |
| 4,402,767 | 9/1983 | Hinze et al. | 148/11.5 |

FOREIGN PATENT DOCUMENTS

| | | |
|---|---|---|
| WO81/00977 | 4/1981 | PCT Int'l Appl. |
| WO81/01013 | 4/1981 | PCT Int'l Appl. |
| 1977077 | 7/1977 | U.S.S.R. ............ 65/1 |
| 893910 | 1/1981 | U.S.S.R. ............ 65/1 |
| 895940 | 1/1982 | U.S.S.R. ............ 65/1 |

Primary Examiner—Robert Lindsay
Attorney, Agent, or Firm—Ronald C. Hudgens; Robert F. Rywalski; Hiram P. Settle

[57] ABSTRACT

A non-precious metal drain bushing for a glass melting apparatus utilized to manufacture continuous glass fibers. The bushing includes a flat plate positioned beneath the bushing block of the apparatus, the flat plate having a longitudinal rib on its undersurface. Drain apertures are provided through the plate and the rib, and electrical contact ears are provided on the rib. The bushing can be manufactured of either dispersion-strengthened alloy or of a heat-resistant alloy which is not dispersion-strengthened.

2 Claims, 3 Drawing Figures

4,518,406

DRAIN BUSHING

TECHNICAL FIELD

This invention relates to drain bushing made from a non-precious alloy for a glass melting apparatus.

BACKGROUND OF THE INVENTION

During the start-up of a glass fiberizing melter or furnace, it is necessary to operate the furnace for an extended period of time, on the order of 5 days, to flush out refractory residue from the construction of the furnace and to ensure stability of the heat pattern of the furnace and the composition of the glass being melted. During this period of time, molten glass must constantly flow from the furnace or "drain." Since the glass is not of commercial quality and the glass cannot be fiberized to form acceptable continuous fibers, the glass flows through a "drain bushing" rather than through a fiberizing bushing.

Such drain bushings, as conventionally utilized in the prior art, are formed of platinum or a platinum alloy, just as are the conventional fiberizing bushings. The conventional drain bushing is of concavo-convex interior configuration to define a glass receiving chamber having an open top surrounded by a peripheral flange which abuts against the lower surface of a conventional bushing block so that glass from the furnace or forehearth drains directly into and through the drain bushing. Glass exists from the drain bushing through a limited number of tips, typically 3, of large diameter. Glass drained through the drain bushing is collected as cullet for disposal or remelting, as desired.

The use of platinum or platinum alloy drain bushings has been standard in the art, but such use results in the necessary expense of the precious metal forming the bushing, the necessity of maintaining a precious metal inventory tied up in such drain bushings, and the expense of control of the precious metal inventory. Consequently, considerable direct and indirect cost savings would result from the development of a drain bushing construction of non-precious metal.

BRIEF DESCRIPTION OF THE PRESENT INVENTION

The present invention proposes a non-precious metal drain bushing for a glass melting apparatus, for example, apparatus of the type utilized to manufacture continuous glass fibers. The bushing can be made either from a non-precious alloy which is dispersion-strengthened or from a non-precious alloy which is not dispersion-strengthened.

The drain bushing of the present invention is of novel design and comprises an upper planar plate adapted to abut the undersurface of the conventional bushing block of a glass melting apparatus, a lower vertical rib on the undersurface of the planar plate and a pair of electrical contact ears on the rib. The plate and the rib have vertical glass flow passages therethrough for accommodating the flow of molten glass from the melting apparatus. Preferably, the apertures are counterbored at their lower ends to provide an enlarged lower opening for ensuring that molten glass does not flood over the undersurface of the vertical rib.

In one preferred embodiment of the invention, particularly useful where dispersion-strengthened alloys are utilized, the plate and the rib are machined from a single piece of dispersion-strengthened alloy, and the ears are welded to the undersurface of the rib. In another preferred embodiment of the invention, particularly desirable where the bushing is made from a a non-dispersion strengthened alloy, the rib is welded to the undersurface of the plate, and the ears are then welded to the rib.

In either event, an extremely simple, easily-fabricated drain bushing structure is provided utilizing a minimum of alloy metal. In fact, the drain bushing of the present invention is so inexpensive that it may be discarded after a single use.

DESCRIPTION OF THE PREFERRED EMBODIMENT

Figure 1:
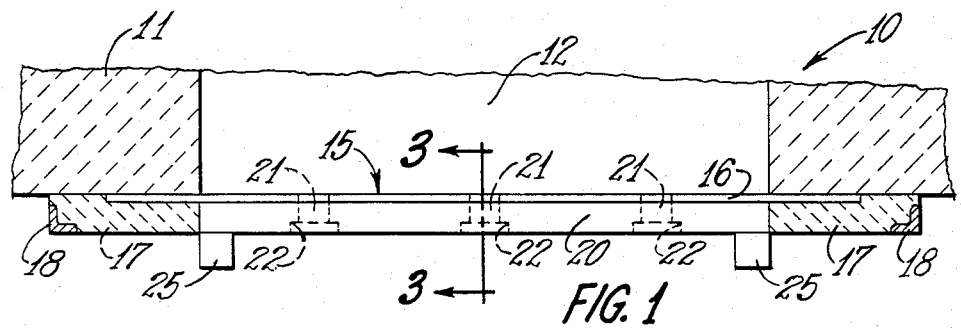
FIG. 1 is a fragmentary vertical sectional view of a glass melting apparatus showing the drain bushing of the present invention as it is installed and intended for use.

As best shown in FIG. 1 of the drawings, reference numeral 10 refers generally to a glass melting apparatus including a refractory bushing block 11 defining a vertical passage 12 normally filled with molten glass from a glass melting operation. The lower end of the passage 12 is closed by the drain bushing of the present invention indicated generally by reference numeral 15 which is secured in position by the conventional furnace support structure including angle irons 18 and castable refractory 17.

Figure 2:
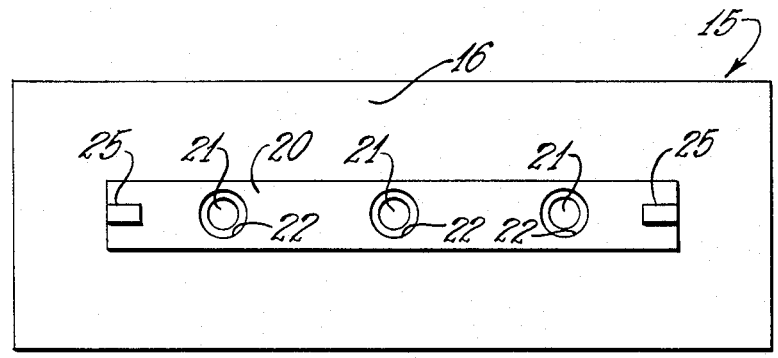
FIG. 2 is a bottom view of the drain bushing of FIG. 1.
Figure 3:
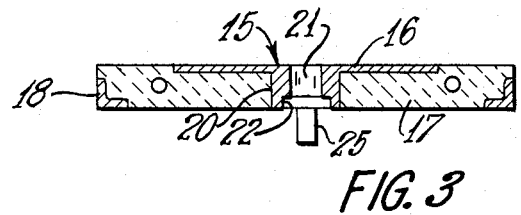
FIG. 3 is a vertical sectional view taken along the plane 3—3 of FIG. 1.

The drain bushing 15 includes an upper planar plate portion 16 of rectangular configuration, as best shown in FIG. 2. The planar portion 16 is of a size and configuration to close the lower end of the bushing block passage 12 and to extend laterally on all sides from the passage 12 to underlie the bushing block 11. The planar portion or plate 16 has a lower rib 20 which may be integrally formed with the portion 16 or secured thereto by suitable means, as by welding. The rib 20 extends medially of the plate portion 16 to longitudinally reinforce the plate 16 against distortion from the heat of the molten glass and to structurally support the plate 16 against the weight of the overlying molten glass. The rib 20 is rectangular in cross-section, and the plate 16 and the rib 20 are provided with vertical drain apertures 21 which traverse both the plate 16 and the rib 20. The apertures 21 are preferably counterbored at their lower ends, as at 22, and as best shown in FIG. 3 of the drawings.

Secured to the undersurface of the rib 20 at each longitudinal extremity thereof is an electrical contact ear 25 which may be integrally formed with or welded to the undersurface of the rib 20. These ears 25 are generally of rectangular configuration and depend from the rib 20 for attachment to the conventional water-cooled ear contact elements of the apparatus 10. It will be noted that the ears 25 project downwardly from the rib 20 to be fully exposed for connection to the electrical contacts. Since the conventional electrical contacts are water-cooled, the ears will be similarly cooled, and it is desirable to place the contacts upon the ears 25 at a location closely underlying the rib 20 to avoid overheating of the ears.

It will be noted that the rib 20 is relatively massive in cross-section when compared to the cross-section of the plate 16. The current flow from one ear 25 to the other is primarily through the rib 20, and the presence of the apertures 20 and the counterbores 22 in the rib results in increased heating in the vicinity of the bores 20, 22, as is desired.

The purpose of the counterbores 22 is to minimize any flooding of molten glass onto the undersurface of the rib, and this effect of the counterbore has proved to be effective during testing.

Where the drain bushing 15 is formed of dispersion-strengthened alloy, the plate 16 and the rib 20 are integrally formed, as by machining from a single block. Where the plate 16 and the rib 20 are formed of non-dispersion-strengthened alloy, the rib may be welded to the plate utilizing a welding material which is essentially the same as or compatible with the material of the plate and the rib. Alternatively, the plate 16 and the rib 20 can be machined from a single block where the elements are of a non-dispersion-strengthened alloy.

As heretofore explained, the bushing block 10 may be formed of a dispersion-strengthened, non-precious metal alloy. Alloys containing primarily nickel, iron or cobalt and about 20% chromium are preferred. A refractory dispersant is also included in the alloy, and these dispersoids may be a metal oxide, metal carbide, metal silicide, metal nitride or a metal boride, which is present in an effective dispersion strengthening amount. Usually, such amounts will be between about 0.1% and about 5.0% by volume. The preferred dispersoid is yttrium oxide.

One of the preferred alloys of the present invention is a ferritic alloy which consists essentially of, by weight, from about 13% to about 35% chromium, about 0.2% to less than about 2% titanium, about 2% to about 7% aluminum, and a small but effective amount of yttria to yield sufficient high temperature strength, i.e., up to less than about 2% yttria, and the balance, apart from incidental elements and impurities, essentially iron. Another preferred alloy is a dispersion-strengthened austenitic alloy which consists essentially of, by weight, approximately 15% to 35% chromium, 0 to about 1% carbon, 0 to about 5% aluminum, 0 to about 2% titanium, 0.4 to about 2% yttria and the balance, apart from incidental elements and impurities, is made up of nickel.

One specifically preferred alloy of the present invention is an Incoloy alloy MA 956, which is commercially available from International Nickel Company. This alloy has the composition: chromium 20%, aluminum 4.5%, titanium 0.5%, yttrium oxide 0.5% and the balance iron. Another specifically preferred alloy of the present invention is Inconel alloy MA 754, also commercially available from International Nickel Company, and consisting essentially of: chromium 20%, carbon 0.05%, aluminum 0.3%, titanium 0.5%, yttrium oxide 0.6%, iron 1.0%, and the balance nickel. The alloy block is recrystallized before machining. For the above fenitic alloy, the material is treated for two hours at 2550° F. For the nickel alloy, the recrystallization takes two hours at 2420° F.

Alternatively, the drain bushing of the present invention can be fabricated from a non-dispersionstrengthened alloy, preferably an alloy which is predominantly nickel and containing from about 14 to about 23% chromium. One such alloy which is preferred is Inconel 600, which is commercially available from the International Nickel Company and which contains about 17% chromium and about 12% iron, the balance being nickel. Other International Nickel alloys which can be utilized include Inconel 601, which is essentially the same as Inconel 600, but containing about 23% chromium; Inconel 625, which contains about 23% chromium and 9% molybdenum; and Inconel alloy X 750, which contains about 7% iron, about 16% chromium and about 2.5% titanium, with the balance being nickel.

Further, as above explained, where the drain bushing 15 is formed of a non-dispersion-strengthened alloy, the rib 20 can be welded to the plate 16, rather than being integrally formed as is preferred when a non-dispersion-strengthened alloy is used. Even when a non-dispersion-strengthened alloy is utilized, the ears 25 can be welded to the rib 20. Suitable welding materials for attaching the rib to the plate or for attaching the ears to the rib, include an Inconel filler rod having essentially the same composition as Inconel 600, above set forth, or a nichrome wire rod, containing about 20% chromium, with the remainder nickel, or other compatible alloys, so long as the welding rod or material is free of silicon.

In one specific example, a drain bushing having a configuration illustrated in FIGS. 1 through 3 of the drawings was fabricated from Inconel alloy MA 754 of the above-defined composition. The plate 16 and the rib 20 were machined from a plate of Inconel 754 which was 0.314" thick, the plate was 15"×5" and was 0.125" thick. The rib 20 had a transverse dimension of 0.60" and was 13" long. The three apertures 21 were 0.310" in diameter and were located on 4.5" centers, the counterbore was 0.4" in diameter and was 0.10" deep. The ears 25 were welded to the undersurface of the rib 20 and were 0.75" square and were 0.250" in thickness. The drain bushing was operated at a pull rate ranging from about 53 pounds per hour to about 92 pounds per hour for an extended period at a current ranging from about 24 amps to about 28 amps. The temperature in Degrees Fahrenheit of the left ear was 2150°, of the right ear 2180°, and the temperature in the center of the rib was 2190°. An excellent heat pattern was established and maintained after about 1 hour from start-up.

A second drain bushing of the same size and configuration was constructed of Inconel 600 alloy of the above-defined composition. The plate and the rib were integral, and the ears were welded to the undersurface of the rib. It was tested in the same manner with comparable results.

Thus, it will be seen that the present invention provides an extremely simple, yet effective drain bushing fabricated from non-precious metal alloys.

We claim:

1. A disposable, non-precious metal drain bushing for draining molten glass from a glass melting apparatus through an outlet opening, comprising an upper flat plate of a size and configuration to cover the outlet opening of the melting apparatus, a lower vertical rib on the undersurface of said plate, a pair of electrical contact ears on the undersurface of the rib and depending therefrom, and a plurality of vertical apertures through said plate and said rib, said apertures being counterbored at their lower ends to minimize flooding of molten glass onto the undersurface of the rib.

2. A single use, non-precious metal drain bushing for attachment to a bushing block of a glass melting apparatus, said block having a vertical glass passage therethrough, comprising a planar plate for attachment to the undersurface of the bushing block to close the glass passage therein, a depending vertical rib on the underside of said plate and extending medially thereof to reinforce the plate against thermal distortion and against the weight of the glass overlying the plate, an electrical contact ear on the undersurface of said rib at each longitudinal extremity of said rib to depend therefrom, a plurality of vertical glass flow passages traversing said plate and said rib, each of said passages having a radially enlarged counterbore at its lower outlet end for accommodating the flow of molten glass therethrough while minimizing flooding of molten glass onto the rib undersurface, and refractory insulating material encasing the plate and the rib to leave only the undersurface of the rib and the depending ears exposed to the ambient atmosphere.

* * * * *